United States Patent [19]

Natori et al.

[11] Patent Number: 4,510,974
[45] Date of Patent: Apr. 16, 1985

[54] FLUID CONVEYING HOSE

[75] Inventors: Takeshi Natori; Yoji Kobayashi; Shigetaka Watanabe; Katsumi Shimizu; Ikuei Matsumura; Yoshihiro Namekawa; Satoshi Miyanaga, all of Ibaragi, Japan

[73] Assignee: Hitachi Cable Ltd., Tokyo, Japan

[21] Appl. No.: 440,048

[22] Filed: Nov. 8, 1982

Related U.S. Application Data

[63] Continuation of Ser. No. 180,176, Aug. 21, 1980, abandoned.

[51] Int. Cl.$^3$ .................................................. F16L 9/16
[52] U.S. Cl. ................................ 138/137; 138/124; 138/125; 138/127
[58] Field of Search ............... 138/124, 125, 126, 127, 138/129, 132, 133, 134, 137, 138, 149, DIG. 10

[56] References Cited

U.S. PATENT DOCUMENTS

| | | | |
|---|---|---|---|
| 3,554,237 | 1/1971 | Pelley et al. | 138/149 X |
| 3,614,967 | 10/1971 | Royston | 138/149 X |
| 3,727,029 | 4/1973 | Chrow | 138/138 X |
| 3,980,107 | 9/1976 | Barnes | 138/149 X |
| 4,172,474 | 10/1979 | Stahl | 138/132 |

Primary Examiner—James E. Bryant, III
Attorney, Agent, or Firm—Sughrue, Mion, Zinn, Macpeak, and Seas

[57] ABSTRACT

A plastic hose suitable for conveying refrigerant in a liquid or gas phase, liquefied gas such as LPG, volatile liquids, or gases such as $CO_2$, $O_2$ or $N_2$ having an impermeable layer or a barrier. The amount of permeation of the gas in the hose to the outside and the amount of permeation of moisture into the hose are limited to extremely small values.

10 Claims, 7 Drawing Figures

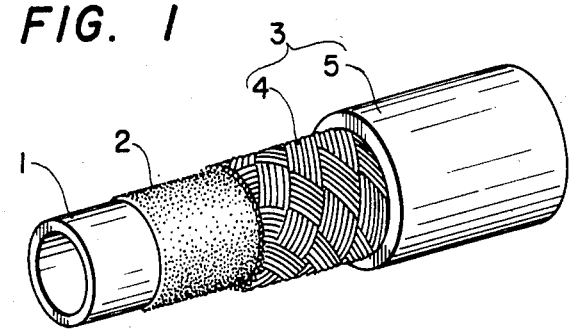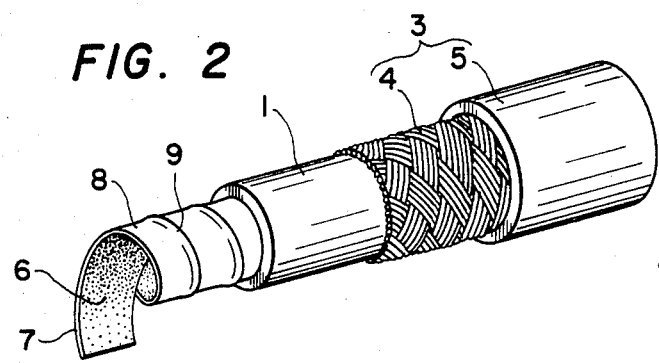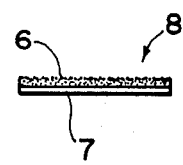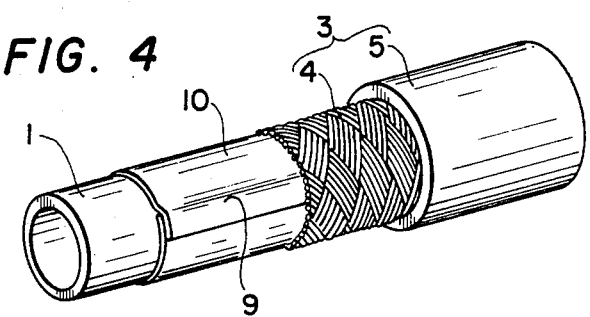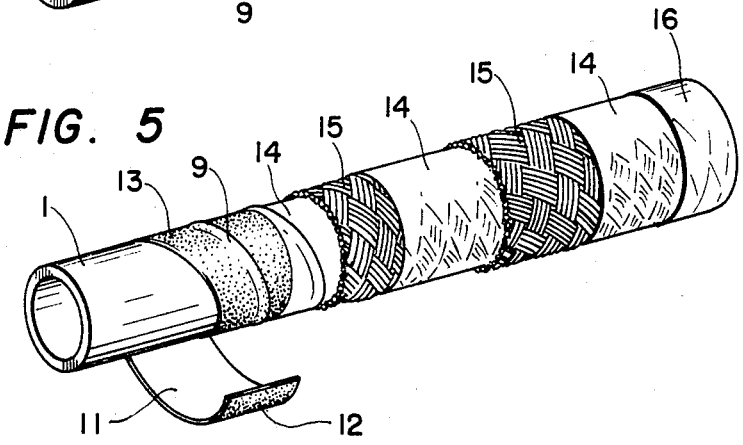

FLUID CONVEYING HOSE

This is a continuation of Ser. No. 180,176, 8/21/80, abandoned.

BACKGROUND OF THE INVENTION

The present invention relates to a hose suitable for conveying refrigerants such as fluorinated hydrocarbons such as Freon TM in a liquid or gas phase, liquefied gases such as LPG, gases such as $CO_2$, $O_2$ or $N_2$, or volatile liquids such as gasoline or gasahol.

Refrigerant gas conveying hoses are employed, for instance, in automotive air conditioning systems. A rubber hose having an inner layer of rubber has been employed for such a gas conveying hose. This type of rubber hose is, however, disadvantageous in that refrigerant gas can pass relatively easily through the rubber hose, the material of the rubber hose may be harmed by the substance being conveyed, and the hose is relatively heavy. Therefore, a refrigerant gas conveying hose having an inner layer made of plastic instead of rubber has been proposed and used commercially. However, if the inner layer is made of polyvinylidene chloride or a polyamide copolymer such as Nylon-6, 10 or Nylon-6, 12, which is a plastic material excellent for preventing the permeation of gas, then the flexibility and heat resistance of the hose are decreased. Nylons are melt processible thermoplastics whose chain structure features repeating amide groups. Such are disclosed for example in "Plastics Progress 1955," pp. 129 et seq., edited by Phillip Morgan M. A., Iliffe & Sons, Ltd.

This difficulty may be overcome by using a polyamide copolymer such as Nylon-11 or Nylon-12. However, in this case, the impermeability factor of the hose will be somewhat reduced. In addition, in the case where the inner layer is made of Nylon-6, 10, moisture in the air may enter the hose during the refrigeration operation which may adversely affect the related operating components. In other words, an inner layer made of Nylon such as Nylon-6 or Nylon-6, 10 of high crystallizability is high in refrigerant gas permeability but low in moisture permeability while an inner layer made of Nylon-11 or Nylon-12 is low in moisture permeability but high in refrigerant gas permeability.

Yet further, it is known in the art that an inner layer made of acrylonitrile rubber (NBR), which has been extensively employed, is low in moisture permeability but high in refrigerant gas permeability.

As can be seen, a conventional hose cannot simultaneously satisfy the desired characteristics as to the moisture permeability and refrigerant gas permeability.

SUMMARY OF THE INVENTION

Accordingly, an object of the invention is to provide a fluid conveying hose which can positively prevent the permeation of fluid.

The foregoing object and other objects of the invention have been achieved by the provision of a fluid conveying hose in which an impermeable layer or barrier made of a material whose fluid permeability is lower than that of an inner layer forming a part of the hose is provided on at least one of the inner and outer surfaces of the inner layer.

In accordance with the invention, a material forming the impermeable layer is preferably a thin metal layer. However, it may be made of a plastic of low refrigerant gas permeability in the case where the inner layer of the hose is made of rubber or plastic which is low in refrigerant gas permeability. The impermeable layer may be inserted directly in the hose or after being laminated on a substrate layer. The substrate layer is preferably made of a plastic material which serves as a carrier or adhesive. The lamination of the impermeable layer and the substrate layer may be achieved by vacuum-evaporating, plating or coating one of the material of the impermeable layer and the substrate layer on the other or by bonding the two materials together.

Examples of the adhesive plastic described above are polymers such as ethylene vinyl acetate copolymer (EVA), ionomer, and ethylene acrylic acid copolymer (EAA) which, upon application of heat, become molten so as to serve as adhesives.

The impermeable layer is preferably formed or provided between the inner layer and the outer layer of the hose because of ease of manufacture. However, it may be provided on the inner wall of the inner layer or as an outer layer as the case may be.

The nature, principle and utility of the invention will become more apparent from the following detailed description and the appended claims which read in conjunction with the accompanying drawings.

BRIEF DESCRIPTION OF THE DRAWINGS

In the accompanying drawings:

FIG. 1 is a perspective view, with parts cut away, showing a first example of a fluid conveying hose constructed according to the present invention;

FIG. 2 is a perspective view, with parts cut away, showing a second example of a hose constructed according to the invention;

FIG. 3 is a sectional view of a belt-shaped tape forming an impermeable layer in the hose in FIG. 2;

FIG. 4 and FIG. 5 are also perspective views, with parts cut away, showing third and fourth examples of a hose constructed according to the invention;

DESCRIPTION OF THE PREFERRED EMBODIMENTS

Figure 6:
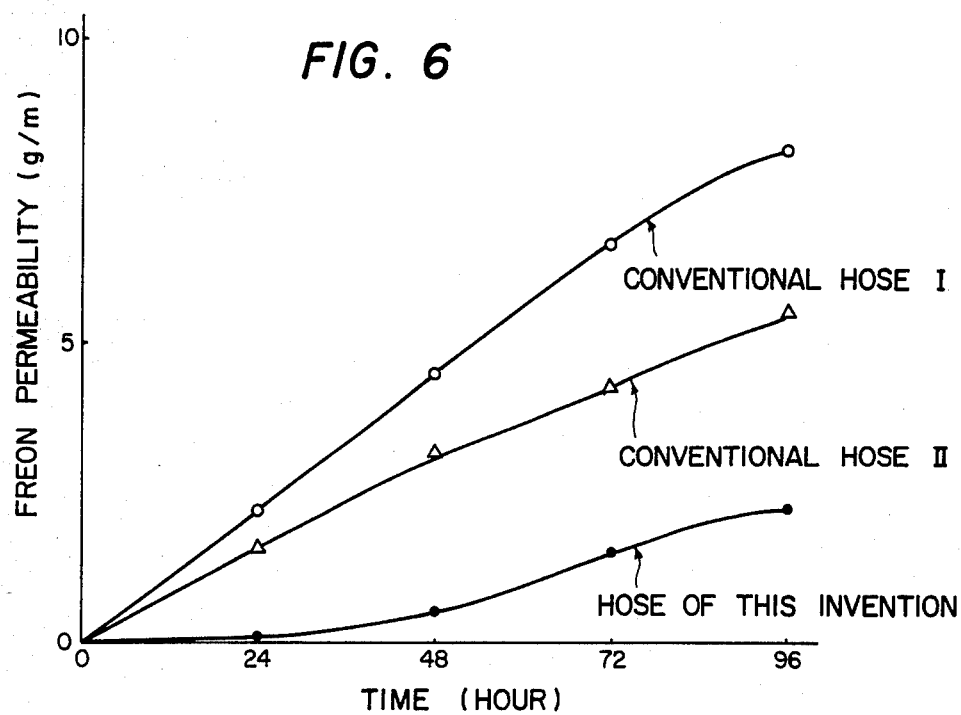
FIG. 6 is a graphical representation indicating amounts of permeation of refrigerant gas with time of the hose in FIG. 5 and two conventional hoses.

A first example of a fluid conveying hose constructed according to the invention, as shown in FIG. 1, includes an inner tube 1, an impermeable layer 2 which here is a thin aluminum film formed on the outer surface of the inner tube 1 by vacuum evaporation, and an outer layer 3 formed on the surface of the impermeable layer 2. The inner tube 1 is a seamless tube made of Nylon-12. Nylon-12 is described in, Deanin, "Nylon-12", SPE Journal, September 1967, pp. 44-47. The basic component is Laurolactam which is polymerized in polyaurolactam and differs from the lower nylons primarily due to its longer methylene chain. The outer tube 3 is constituted by a reinforcing layer 4, which may be a single or double layer of braided synthetic fibers such as braided 12-Nylon fibers, and a seamless protective cover layer 5 of polyurethane which is formed on the reinforcing layer 4.

The impermeable layer 2 is constructed as a single thin member. The layer 2 serves effectively as a barrier to prevent the permeation of fluids from both inside and outside without affecting the flexibility of the hose.

More specifically, in the case where, for instance, a refrigerant gas is conveyed by the hose, the gas may permeate the inner tube 1 but it is blocked by the layer 2 so that leakage of gas from inside the hose is prevented while the entry of moisture from the outside is blocked by the layer 2. Thus, such a hose can be used to prevent gas from entering the related equipment such as the compressor system of an automotive air conditioner.

A second example of a hose constructed according to the invention is shown in FIG. 2 in which an impermeable layer 8 is provided on the inner wall of the inner tube 1. The impermeable layer 8 in this embodiment is a compound tape having a thickness of several tens of micrometers and a width of about 50 mm and it is prepared by forming an aluminum film 6 by vacuum evaporation on an adhesive plastic film 7 as shown in FIG. 3. The compound tape applied to the inner wall of the tube 1 may also be a tape manufactured by bonding together an aluminum tape and a plastic tape. The compound tape is spirally wound into a tube having seams and is placed next to the inner wall of the inner tube 1 with the plastic film layer 7 in contact with the inner surface of the inner tube 1. The formation of the tube with the impermeable layer 8 can be readily achieved as follows. While molding the inner tube 1 by extrusion, the layer 8 is fed while being wound on a mandrel in such a manner that it overlaps itself with the aluminum film maintained on the inside so that the tape is stuck onto the inner wall of the tube 1 during the extrusion molding process. In this operation, the tape 8 is heated in the extrusion head as a result of which the plastic tape 7 is softened and made sticky so that the tape 8 readily sticks onto the inner wall of the inner tube 1.

In the above-described second example, the impermeable layer 8 has spiral seams and therefore the barrier effect is lower than that of a seamless impermeable layer. However, the impermeable layer 8 can be more easily manufactured than in the case where the layer is applied directly to the inner wall of the inner tube 1.

A third example of a hose constructed according to the invention is shown in FIG. 4 in which an impermeable layer 10 provided between an inner tube 1 and a reinforcing layer 4 is an aluminum tape which extends longitudinally of the hose to surround the inner tube 1 with an overlap 9. The barrier effect of the impermeable layer 10 is higher than that of an impermeable layer which is spirally wound. The impermeable layer 10 is retained by an outer layer 3 which is formed on the layer 10. Therefore, even if the overlap or seam of the layer 10 is not bonded and sealed, it will not open. The impermeable layer 10 may be provided as the above-described compound tape including a plastic film. In this case, after being placed over the inner tube 1, the impermeable layer 10 is subjected to a heat treatment so that it is positively bonded to the inner tube and/or the reinforcing layer 4. In the hose thus formed, the overlap 9 is maintained positively sealed even when the hose is bent. In the third example of a hose of the invention, the impermeable layer 10 is formed extending longitudinally of the hose. However, the layer 10 may be spirally wound on the inner tube.

Shown in FIG. 5 is a fourth example of a hose constructed according to the invention in which an impermeable layer 13 is formed by spirally winding a compound tape 11. The compound tape 11 is preferably about 50 mm in width. The compound tape 11 is prepared by forming an aluminum film 12 by vacuum evaporation on one surface of a polyester tape having a thickness of about 12μ. The compound tape 11 thus prepared is wound on the inner tube 1 with the aluminum film 12 outside. An outer layer is formed on the impermeable layer 13 which was formed on the inner tube. The outer layer is constituted by a first Nylon-12 coating layer 14, a first reinforcing layer 15 made of braided Nylon-6 fibers, a second Nylon-12 coating layer 14, a second reinforcing layer 15, and a third Nylon-12 coating layer 14 which are arranged in the stated order. Formed over the outermost or third coating layer 14 is a battery acid resisting coating layer 16, made of a fluorinated resin for instance, to prevent corrosion of the hose.

In this example, the outer layer is made up of extremely thin coating layers 14 and porous braided fiber layers 15. With this construction if, for instance, refrigerant gas has passed through the inner layer 1 and the impermeable layer 13, it can then pass to the outside without further hindrance. Accordingly, the hose in FIG. 5, unlike a hose having a protective layer with a large wall thickness, has no difficulty in passing gas through the protective layer and accordingly the hose will not inflated by the gas. Because of this, it is desirable that the protective cover 5 in each of the examples shown in FIGS. 1, 2 and 4 be replaced by the above-described composite coating layer.

The coating layers 14 are bonded to the braided layer 15 and the impermeable layer 13 simultaneously when the layers 14 are formed by braiding Nylon-12 fibers. Therefore, the coating layers 14, braided layers 15 and the impermeable layer 13 cannot be displaced from one another or peeled off. This provides another advantage in that, when the end of the hose is cut before inserting the end between the socket and the nipple of a connecting fixture, the fibers of the braided layers 5 are maintained regular and do not become frayed so that the end of the hose can be easily handled. Furthermore, the hose of FIG. 5, unlike those shown in FIGS. 1, 2 and 4, has an outer layer constituted by only reinforcing layers 15 and coating layers 14. Because of this construction, the flexibility of the hose is quite excellent.

FIG. 6 is a graphical representation indicating results of SAE J51b (Automotive Air Conditioning Hose) permeability tests performed upon three hoses as described below using "Freon R-12" (trade name) gas. Each of the three hoses had an inner tube of 9 mm inside diameter and a wall thickness of 1.25 mm. One of the three hoses was a hose as shown in FIG. 5, hereinafter referred to as the "improved hose" when applicable, while the remaining two hoses were of conventional constructions, hereinafter referred to as "conventional hose I" and "conventional hose II". Conventional hose I had an inner tube made of Nylon-12, two reinforcing layers of Nylon-6 and a protective cover of Nylon-12, while conventional hose II had an inner tube made of Nylon-66, 6, two reinforcing layers of Nylon-6 and a protective cover of Nylon-66, 6. As is apparant from FIG. 6, the amount of permeation of gas in the improved hose was about one-fourth of that for conventional hoses I and II.

Figure 7:
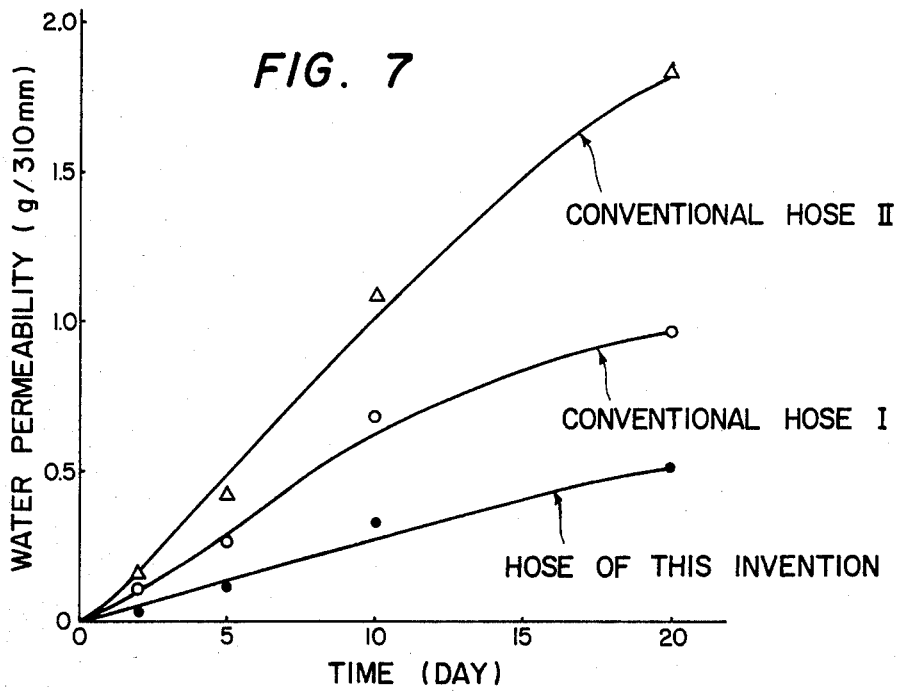
FIG. 7 is a graphical representation indicating amounts of permeation of moisture with time of the hose in FIG. 5 and the two conventional hoses.

FIG. 7 is a graphical representation indicating results of measurements on the above-described three hoses which were carried out as follows. Molecular sieves were placed in each of the three hoses and the hoses were placed in an atmosphere maintained at 40° C. with a relative humidity of 95% and the amount of permeation of moisture from outside the hoses was determined from variations in the weight of the molecular sieves. As is clear from FIG. 7, the amount of permeation of moisture in the improved hose was much less than that for the conventional hoses I and II.

While the invention has been described with reference to the case where the refrigerant gas is conveyed, a hose constructed according to the invention can be used to effectively reduce the amount of permeation of liquids such as LPG, for gases such as $CO_2$, $O_2$ or $N_2$ (which are normally compressed for conveyance) or for volatile gases such as gasoline or gasahol.

In the examples shown in FIGS. 1, 2, 4 and 5, the inner layer 1 is described as being made of polyamide resin to improve the flexibility, heat resistance and workability of the hose. However, the inner layer 1 may be made of a plastic material such as other polyamide resins, polyester resin or polyvinylchloride, or a rubber material such as polychloroprene rubber or acrylonitrile rubber. A hose having an inner tube made of a rubber material as described above has a fundamentally lower permeation resistance than a hose whose inner tube is made of polyamide. A hose having an inner tube made of rubber material may have a somewhat lower refrigerant permeation resistance. However, it is advantageous in that it is suitable for use in a curved or bent pipe arrangement and is excellent with respect to vibration absorption. In addition, the amount of permeation of refrigerant gas for such a hose is much less than for a rubber hose having no impermeable layer.

As is clear from the above description, the provision of an impermeable layer on the surface of the inner tube of the hose according to the invention makes it possible for the hose to sufficiently satisfy the above-described requirements of gas permeability, moisture permeability and heat resistance.

What is claimed is:

1. A fluid conveying hose comprising:
   an inner layer of plastic;
   an impermeable layer formed on said inner layer, said impermeable layer being made of a material which is lower in fluid permeability than that of said inner layer, said impermeable layer comprising a plastic film having an overlapping seam and having a surface which is integrally evaporated with a metal film;
   a first plastic coating layer and a first reinforcing layer of fibers formed on said impermeable layer; and
   an outermost coating means adapted to resist battery acid and comprising a battery acid resistant material.

2. The fluid conveying hose as claimed in claim 1 in which said overlapping seams is spirally formed.

3. The fluid conveying hose as claimed in claim 1 in which said impermeable layer is bonded to at least one of said inner layer and said outer layer.

4. The fluid conveying hose as claimed in claim 1 wherein said impermeable layer is made by forming an aluminum film on an adhesive plastic film by using vacuum evaporation.

5. The fluid conveying hose of claim 1, wherein said inner layer is made of polyamide resin and said evaporated metal comprises aluminum.

6. The fluid conveying hose of claim 1 wherein said first reinforcing layer of fibers is formed on said first plastic coating layer.

7. The fluid conveying hose of claim 6 further comprising a second plastic coating layer formed on said first reinforcing layer, a second reinforcing layer of fibers formed on said second plastic coating layer, and a third plastic coating layer formed on said second reinforcing layer, said outermost coating layer being formed on said third plastic layer.

8. The fluid conveying hose of claim 1 wherein said outermost coating means adapted to resist battery acid is made of fluorinated resin.

9. The fluid conveying hose of claim 1 wherein said coating layer and said reinforcing layer are thin so that gases can readily pass therethrough.

10. The fluid conveying hose of claim 1 wherein said coating layer is formed by braiding Nylon-12 fibers, said coating layer being bonded to said impermeable layer and said reinforcing layer simultaneously.

* * * * *